(12) United States Patent
Kim et al.

(10) Patent No.: US 12,081,621 B2
(45) Date of Patent: Sep. 3, 2024

(54) IoT COMMUNICATION SYSTEM SUPPORTING CONNECTION BETWEEN DEVICES

(71) Applicant: C&TECH, Daejeon (KR)

(72) Inventors: Ki Duk Kim, Daejeon (KR); Seung Hyun Park, Sejong-si (KR); Jeong Ho Lee, Daejeon (KR)

(73) Assignee: C&TECH, Daejeon (KR)

( * ) Notice: Subject to any disclaimer, the term of this patent is extended or adjusted under 35 U.S.C. 154(b) by 0 days.

(21) Appl. No.: 17/909,976

(22) PCT Filed: Nov. 5, 2021

(86) PCT No.: PCT/KR2021/015992
§ 371 (c)(1),
(2) Date: Sep. 7, 2022

(87) PCT Pub. No.: WO2022/181929
PCT Pub. Date: Sep. 1, 2022

(65) Prior Publication Data
US 2023/0396675 A1     Dec. 7, 2023

(30) Foreign Application Priority Data

Feb. 26, 2021   (KR) .......... 10-2021-0026881
Oct. 25, 2021   (KR) .......... 10-2021-0142826

(51) Int. Cl.
*H04L 67/12*   (2022.01)
*H04L 67/1097*   (2022.01)

(52) U.S. Cl.
CPC ........ *H04L 67/12* (2013.01); *H04L 67/1097* (2013.01)

(58) Field of Classification Search
CPC .................... H04L 67/1097; H04L 67/12
See application file for complete search history.

(56) References Cited

U.S. PATENT DOCUMENTS

| | | | | |
|---|---|---|---|---|
| 4,733,386 | A | * | 3/1988 | Shimoi ............ G11B 27/329 |
| 2017/0286337 | A1 | | 10/2017 | Wang et al. |
| 2020/0336663 | A1 | * | 10/2020 | Kim ............ H04N 23/6812 |

FOREIGN PATENT DOCUMENTS

| | | | | |
|---|---|---|---|---|
| CN | 102238603 | A | * 11/2011 | |
| CN | 108199867 | A | * 6/2018 | ....... H04L 41/14 |
| CN | 104637273 | B | * 9/2018 | |

(Continued)

*Primary Examiner* — Shean Tokuta
(74) *Attorney, Agent, or Firm* — INVENSTONE Patent, LLC (57) ABSTRACT

The present disclosure relates to an IoT communication system supporting connection between devices. The present disclosure provides an IoT device comprising a connect unit connecting with a sensor module, a processor performing data communication with the sensor module through the connect unit, a device memory storing data read from the sensor module through the data communication, and a communication module wirelessly transmitting the data stored in the device memory. The present disclosure connects an existing sensor module without a communication function with an IoT device equipped with a communication function and supports a standardized protocol between them, thereby enabling the IoT device to relay the sensor module's data and constructing a cost-effective IoT communication system.

16 Claims, 8 Drawing Sheets

(56) References Cited

FOREIGN PATENT DOCUMENTS

| KR | 10-2014-0029364 A | 3/2014 |
| KR | 101919472 B1 * | 11/2018 |
| KR | 10-2019-0035988 A | 4/2019 |
| KR | 10-2020-0009890 A | 1/2020 |

* cited by examiner

| ADDRESS | DATA | |
|---|---|---|
| Index address(ADD_INDEX) | Start address | End address |
| ... | ... | |
| Start address (ADD_0) | Data (0) | |
| ... | ... | |
| End address (ADD_n-1) | Data (n-1) | |

IoT COMMUNICATION SYSTEM SUPPORTING CONNECTION BETWEEN DEVICES

CROSS-REFERENCE TO RELATED APPLICATIONS

This application is a National Stage filing under 35 U.S.C. 371 of International Application No. PCT/KR2021/015992, filed on Nov. 5, 2021, which claims the benefit of earlier filing date and right of priority to Korean Application No. 10-2021-0026881, filed on Feb. 26, 2021, and Korean Application No. 10-2021-0142826, filed on Oct. 25, 2021 in the Korean Intellectual Property Office, the contents of which are all hereby incorporated by reference herein in their entirety.

BACKGROUND

Technical Field

The present disclosure relates to an Internet of Things (IoT) communication system and more particularly, to an IoT communication system supporting connection between devices.

Background Art

Since a sensor module does not have a communication function or a communication module, it may not collect sensing data wirelessly. Data collection may be easily solved if the sensor module is equipped with a communication function; however, IoT devices and sensor modules are used together in many cases due to environmental constraints and the cost of building a sensor system. In other words, making all the sensor modules into "IoT devices" is not desirable since it goes against a sensor module's utility, ease of installation, and cost reduction effect. Change of hardware and firmware may be considered a method for "making an existing sensor module into an IoT device" with minimal cost and change. However, hardware or firmware change may cause an additional development period and cost for many device manufacturers. Therefore, in an environment where sensor modules and IoT devices coexist, there needs to be an effective IoT communication system that integrates them.

SUMMARY

A technical object of the present disclosure is to provide an IoT communication system supporting connection between devices.

Another technical object of the present disclosure is to support connection between a sensor module without a communication function and an IoT device equipped with a communication function and provide a standardized communication protocol between them.

Yet another technical object of the present disclosure is to provide a method for relaying and wirelessly transmitting sensing data of a sensor module and an IoT device implementing the method.

Still another technical object of the present disclosure is to provide a method for wirelessly transmitting sensing data through connection to an IoT device equipped with a communication function and a sensor module implementing the method.

According to one aspect of the present disclosure, an IoT device is provided.

The IoT device comprises a connect unit connecting with a sensor module, a processor performing data communication with the sensor module through the connect unit, a device memory storing data read from the sensor module through the data communication, and a communication module wirelessly transmitting the data stored in the device memory.

Here, the data communication is performed based on a standardized communication protocol between the sensor module and the IoT device.

In one aspect, the standardized communication protocol comprises requesting to the sensor module, by the processor, address information stored at a predefined index address within a memory of the sensor module, receiving, by the processor, the address information from the sensor module, and based on a start address and an end address indicated by the address information, reading, by the processor, the data stored in an area within the memory of the sensor module ranging from the start address to the end address.

In another aspect, the reading of the data includes sequentially requesting to the sensor module, by the processor, a data block stored at each address ranging from the start address to the end address and receiving data blocks stored at the respective addresses from the sensor module by the processor.

In yet another aspect, the processor may initiate the standardized communication protocol when an interrupt signal is received from the sensor module.

In still another aspect, the processor may perform the data communication based on one of the Universal Asynchronous Receiver/Transmitter (UART), Inter-Integrated Circuit (I2C), and Serial Peripheral Interface (SPI) protocols.

In yet still another aspect, the processor may update the data by performing the data communication based on a predetermined period.

In still yet another aspect, the processor may change the period when an interrupt signal is received from the sensor module.

In yet further another aspect, a first area of the device memory may be synchronized based on a first area of the memory of the sensor module, and a second area of the memory of the sensor module may be synchronized based on a second area of the device memory.

In still further another aspect, the first area and the second area of the device memory are predetermined to have predetermined values, and the first area and the second area of the memory of the sensor module may be predetermined to have predetermined values.

According to another aspect of the present disclosure, a sensor module is provided.

The sensor module comprises a sensor generating data through sensing; a memory sequentially storing the data at each address ranging from a start address to an end address and storing address information on the start address and the end address at a predefined index address; a connect unit connecting with an IoT device; and a processor performing data communication with the IoT device through the connect unit and transmitting the data stored in the memory of the sensor module to the IoT device.

Here, the data communication is performed based on a standardized communication protocol between the sensor module and the IoT device.

In one aspect, the standardized communication protocol comprises receiving from the IoT device, by the processor, a request for address information stored at the index address, transmitting, by the processor, the address information to the IoT device, receiving from the IoT device, by the processor, a request to transmit the data in an area ranging from the start address to the end address indicated by the address information, and transmitting, by the processor, the data to the IoT device.

In another aspect, the processor may initiate the standardized communication protocol when transmitting an interrupt signal to the IoT device.

In yet another aspect, the processor may perform the data communication based on one of the Universal Asynchronous Receiver/Transmitter (UART), Inter-Integrated Circuit (I2C), and Serial Peripheral Interface (SPI) protocols.

In still another aspect, the processor may transmit the data to the IoT device by performing the data communication based on a predetermined period.

In yet still another aspect, the processor may change the period when transmitting an interrupt signal to the IoT device.

In still yet another aspect, a first area of a memory of the IoT device may be synchronized based on a first area of the memory of the sensor module, and a second area of the memory of the sensor module may be synchronized based on a second area of the memory of the IoT device.

In yet further another aspect, the first area and the second area of the memory of the IoT device are predetermined to have predetermined values, and the first area and the second area of the memory of the sensor module may be predetermined to have predetermined values.

In still further another aspect, the data communication may be preset to a specific value and the start address and the end address in the memory of the sensor module storing the data may be preset to a specific value.

The present disclosure connects an existing sensor module without a communication function to an IoT device equipped with a communication function and supports a standardized protocol between them, thereby enabling the IoT device to relay the sensor module's data and constructing a cost-effective IoT communication system.

DESCRIPTION OF EXEMPLARY EMBODIMENTS

Specific structural or functional descriptions of embodiments according to the concept of the present disclosure described herein are illustrated solely for the purpose of describing embodiments according to the concept of the present disclosure, and embodiments according to the concept of the present disclosure may be embodied in various forms and are not limited to the embodiments described herein.

Since the embodiments according to the concept of the present disclosure may be modified in various ways and may have various forms, specific embodiments will be depicted in the appended drawings and described in detail with reference to the drawings. However, it should be understood that the specific embodiments are not intended to limit the gist of the present disclosure to the specific embodiments; rather, it should be understood that the specific embodiments include all of the modifications, equivalents, or substitutes belonging to the technical principles and scope of the present disclosure.

Terms such as first and second may be used to describe various constituting elements, but the constituting elements should not be limited by the terms. The terms are introduced to distinguish one element from the others. For example, without departing from the technical scope of the present disclosure, a first element may be referred to as a second element, and similarly, the second element may be referred to as the first element.

When a constituting element is said to be "connected" or "attached" to another constituting element, the former may be connected or attached to the latter element directly, but it should be understood that a third constituting element may be present between the two elements. On the other hand, when a constituting element is said to be "directly connected" or "directly attached" to another constituting element, it should be understood that there is no other constituting element present between the two elements. Meanwhile, other expressions describing a relationship between constituting elements, namely "between" and "right between" or "directly adjacent to" should be interpreted to provide the same implication.

Terms used in the present disclosure are intended only for describing a specific embodiment and are not intended to limit the technical scope of the present disclosure. A singular expression should be understood to indicate a plural expression unless otherwise explicitly stated. The term "include" or "have" is used to indicate the existence of an embodied feature, number, step, operation, element, component, or a combination thereof; and should not be understood to preclude the existence or possibility of adding one or more other features, numbers, steps, operations, elements, components, or a combination thereof.

Unless defined otherwise, all the terms used in the present disclosure, including technical or scientific terms, provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

In what follows, embodiments of the present disclosure will be described in detail with reference to the appended drawings. However, the technical scope of the appended claims is not limited by the specific embodiments. The same reference symbols used in the respective drawings represent the same members.

A module used in the present disclosure may refer to hardware capable of performing a function or an operation due to each of the names described herein, may refer to computer program code capable of performing a specific function or operation, or may refer to an electronic recording medium equipped with the computer program code capable of the specific function or operation, such as a processor or a microprocessor.

In other words, a module may indicate a functional and/or structural combination of hardware for performing the technical principles of the present disclosure and software for operating the hardware.

A sensor module disclosed herein refers to a module that generates data through sensing but does not have a communication module or an antenna. In other words, the sensor module is an existing sensor module not equipped with a communication module. The sensor module refers to a device having a sensing function and a function for generating/processing sensing data and may be referred to by various terms such as a sensor device, a sensing module, a sensor device, a sensing terminal, a sensing station, and a sensor node.

An IoT device disclosed herein refers to a device equipped with a sensor module, a communication module, and an antenna. While consuming little energy, the IoT device may transmit a relatively small amount of data (e.g., sensing data) to a wireless access station (e.g., a base station or an AP). For example, the IoT device may perform NarrowBand-Internet of Things (NB-IoT) communication. Also, the IoT device may support Low Power Wide Area (LPWA) communication through a mobile communication network. The IoT device may be referred to by various terms such as an IoT terminal, an IoT communication terminal, an IoT device, an IoT station, and an IoT node.

Generally, a sensor network or a sensor system is built so that a sensor module and IoT devices are used together. Since a sensor module does not have a communication function or a communication module, sensing data may not be collected wirelessly. Wireless collection of sensing data may be easily achieved once the sensor module is equipped with a communication function; however, making all the sensor modules into "IoT devices" is not desirable since it goes against a sensor module's utility, ease of installation, and cost reduction effect. Change of hardware and firmware may be considered a method for "making an existing sensor module into an IoT device" with minimal cost and change.

Figure 1:
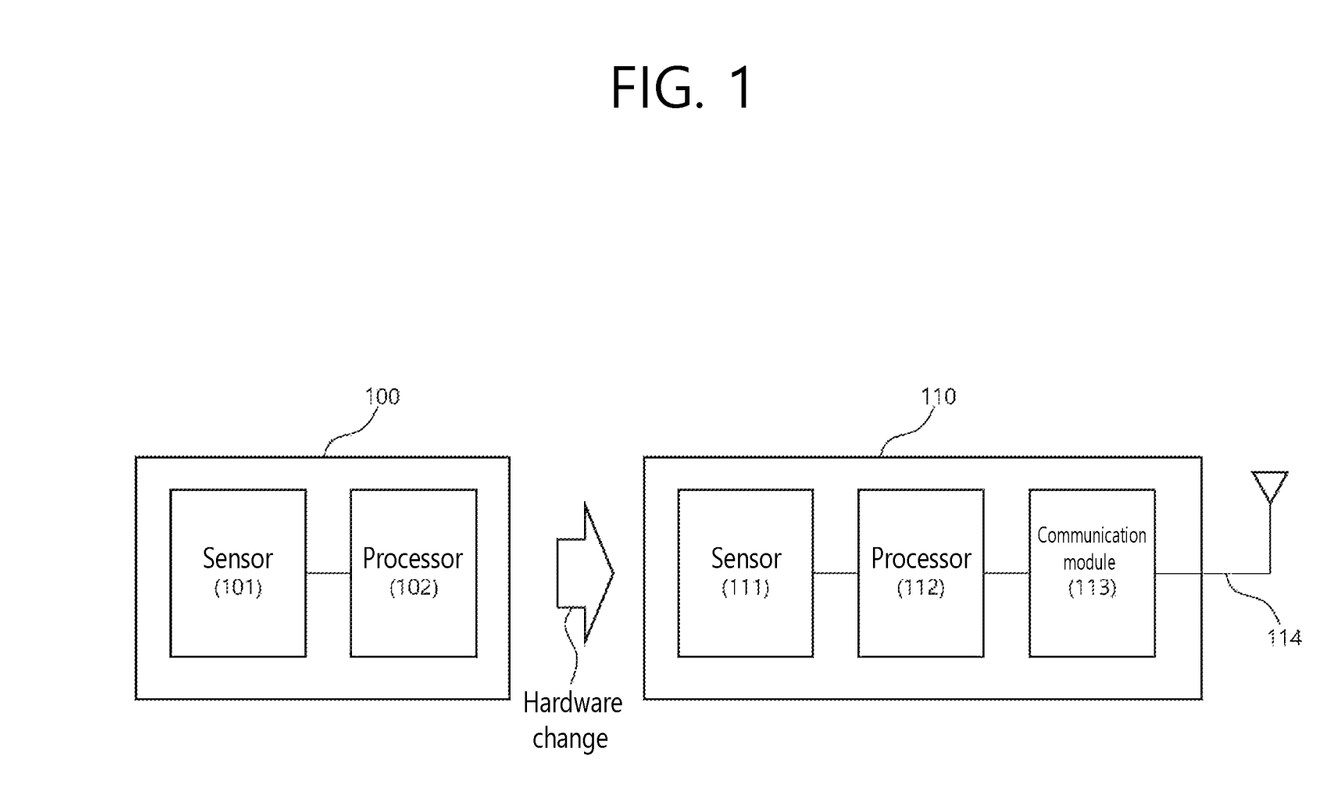
FIG. 1 illustrates a sensor module and an IoT device according to one example.

FIG. 1 illustrates a sensor module and an IoT device according to one example.

Referring to FIG. 1, a sensor module 100 comprises a sensor 101 and a processor 102; and an IoT device 110 comprises a sensor 111, a processor 112, a communication module 113, and an antenna 114. For the sensor module 100 to become an "IoT device", a communication module and an antenna should be embedded into the sensor module 100 so that the sensor module 100 may eventually have the same form as the IoT device 100. In other words, it is necessary to change the hardware of the sensor module 100.

Figure 2:
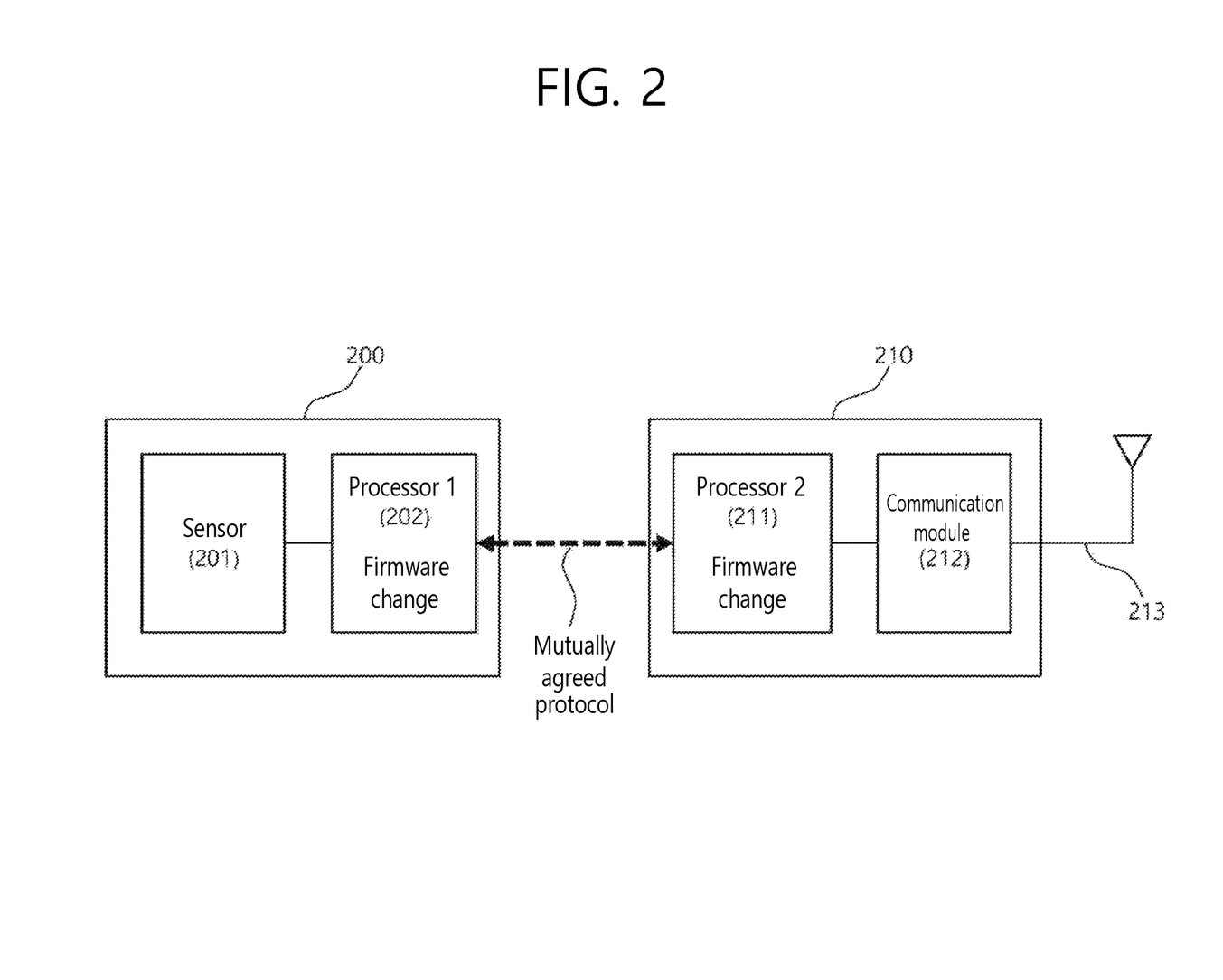
FIG. 2 illustrates a sensor module and an IoT device according to another example.

To make a sensor module into an "IoT device" without involving hardware change, a method of connecting a sensor module with an IoT device as shown in FIG. 2 may be used.

FIG. 2 illustrates a sensor module and an IoT device according to another example.

Referring to FIG. 2, a sensor module 200 comprises a sensor 201 and processor 1 202; and an IoT device 210 comprises processor 2 211, a communication module 212, and an antenna 213. In the present embodiment, for the sensor module 200 to become an "IoT device," the sensor module 200 may be connected to the IoT device 210, and the sensor module 200 may transmit sensing data wirelessly by using the communication module 212 provided in the IoT device 210. In other words, the communication function absent in the sensor module 200 may be supplemented by the communication module 212 of the IoT device 210, in which case the IoT device 210 performs the role of a relay device for transmission of the data of the sensor module 200.

At this time, for data communication between the sensor module 200 and the IoT device 210, processor 1 202 of the sensor module 200 and processor 2 211 of the IoT device may use a mutually agreed protocol. The internal firmware of processor 1 202 and processor 2 211 may be modified to implement the protocol. In other words, changing the firmware of the processors of both devices is necessary.

However, hardware change as shown in FIG. 1 or firmware change as shown in FIG. 2 may cause an additional development period and a cost burden for device manufacturers. Accordingly, an IoT communication system is required, which integrates a sensor module and an IoT device cost-effectively in an environment where sensor modules and IoT devices coexist.

An IoT communication system according to the present embodiment provides a standardized protocol between a sensor module and an IoT device. According to the present embodiment, without changing the hardware or firmware of an existing device (i.e., a sensor module) or an IoT device, the two devices may be connected to each other using a standardized protocol.

Figure 3:
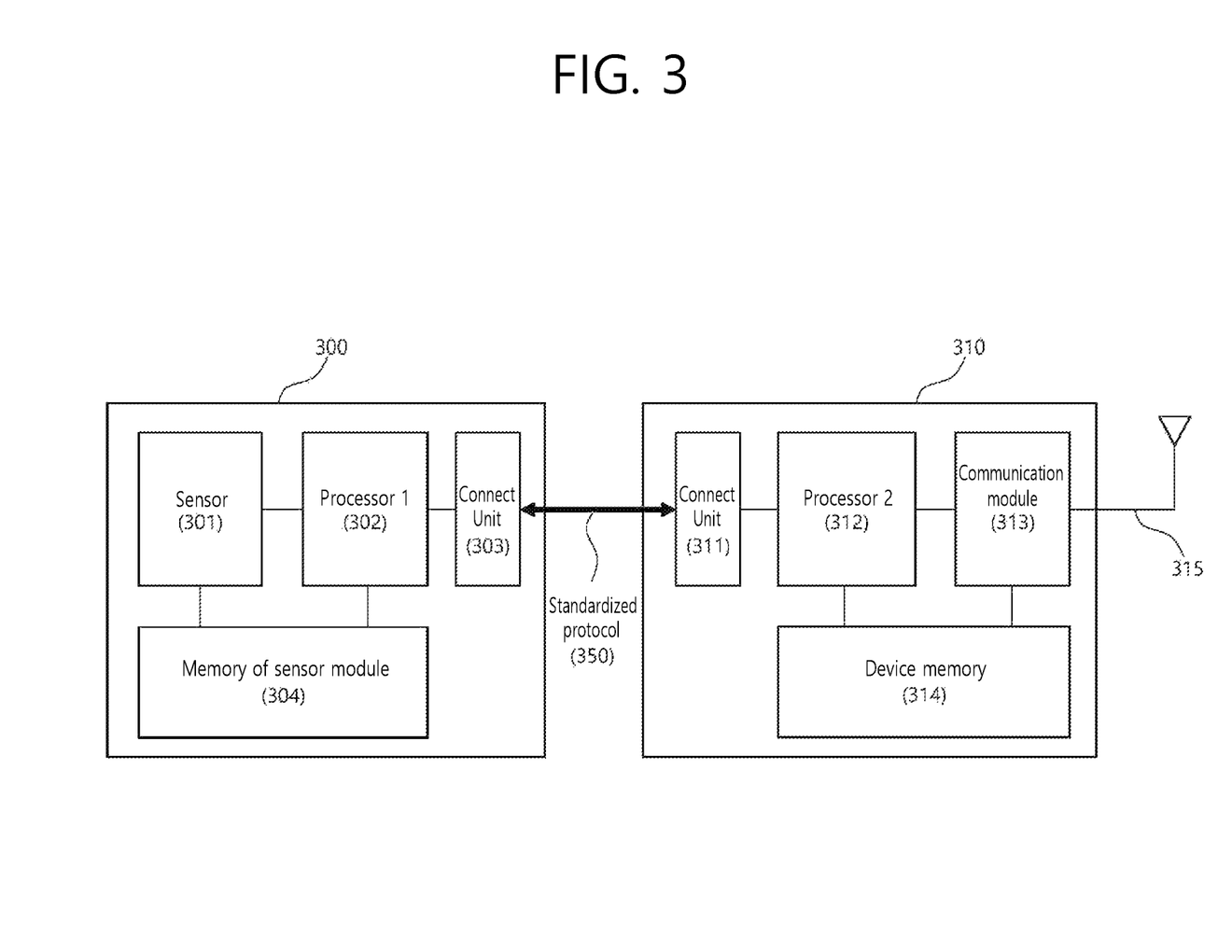
FIG. 3 illustrates a sensor module and an IoT device according to the present disclosure.

FIG. 3 illustrates a sensor module and an IoT device according to the present disclosure.

Referring to FIG. 3, a sensor module 300 comprises a sensor 301, processor 1 302, a connect unit 303, and a memory 304 of the sensor module.

The sensor 301 generates sensing data through sensing and is electrically connected to the memory 304 of the sensor module and processor 1 302.

The processor 1 302 is configured to perform data communication with the IoT device 310 through the connect unit 303. The processor 1 302 may include an application-specific integrated circuit (ASIC), another chipset, a logic circuit, and/or a data processing device.

The connect unit 303 is configured to provide an electrical connection line to the connect unit 311 of the IoT device 310 and perform data communication. The connect unit 303 may follow a wired connection protocol and may support at least one of the Universal Asynchronous Receiver/Transmitter (UART), Inter-Integrated Circuit (I2C), and Serial Peripheral Interface (SPI) protocols.

The memory 304 of the sensor module may include the processor's cache, specific registers, a read-only memory (ROM), a random access memory (RAM), a flash memory, a memory card, a storage medium, and/or other storage devices.

Next, the IoT device 310 includes a connect unit 311, processor 2 312, a communication module 313, a device memory 314, and an antenna 315.

The connect unit 311 is configured to be electrically connected to the sensor module 300 through the connect unit 303. The connect unit 311 may use a wired connection protocol and may support at least one of the UART, I2C, and SPI protocols.

The processor 2 312 is configured to perform data communication with the sensor module 300 through the connect unit 311.

The communication module 313 is configured to transmit the data stored in the device memory 314 wirelessly through the antenna 315.

The device memory 314 stores the data read through the processor 2 312 from the sensor module 300.

A standardized protocol 350 for transmitting data collected by the sensor module 300 to the IoT device 310 is defined between the sensor module 300 and the IoT device 310. In other words, being electrically connected with each other by the connect units 303, 311, the sensor module 300 and the IoT device 310 perform data communication according to the standardized protocol 350. The standardized protocol 350 may relate to a communication procedure between processor 1 302 and processor 2 312. When the embodiment of the present disclosure is implemented in software, the standardized protocol 350 may be implemented as a module (process, function, and the like) that performs the function described above. The module may be stored in the memory 304 of the sensor module and executed by processor 1 302. The memory 304 of the sensor module may be installed inside or outside processor 1 302 and may be connected to processor 1 302 by various well-known means.

In what follows, the memory 304 of the sensor module (or a register table of processor 1 302) and the standardized protocol 350 will be described in detail.

Figure 4:
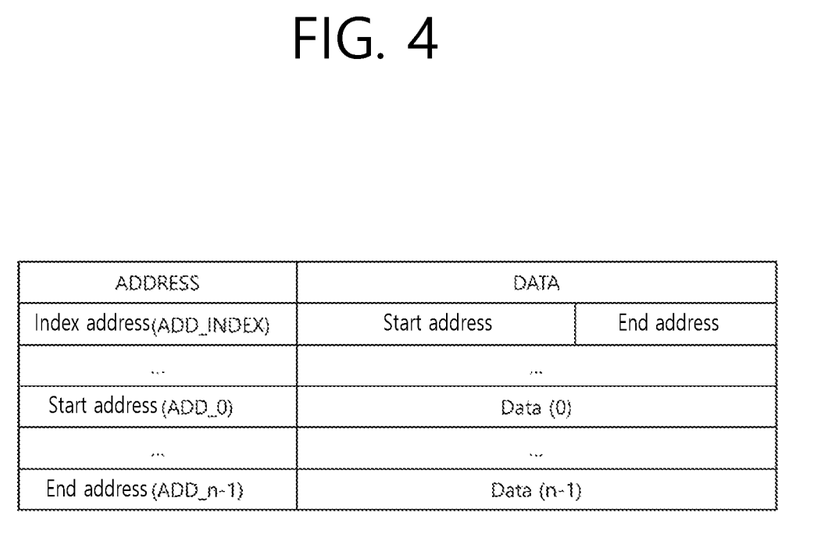
FIG. 4 is an example of a memory table of a sensor module according to one embodiment.

FIG. 4 is an example of a memory table of a sensor module according to one embodiment. In the present embodiment, registers of the memory 304 of the sensor module may correspond to the registers of processor 1 302.

Referring to FIG. 4, a register table of the memory 304 of the sensor module is composed of a plurality of addresses and data corresponding to each address. A plurality of addresses in the register table includes an index address ADD_INDEX, a start address ADD_0, and an end address ADD_n−1. Data is stored at each address. For example, sensing data is stored at a total of n addresses ranging from the start address ADD_0 to the end address ADD_n−1. The number of addresses at which sensing data are stored may vary depending on the size of sensing data.

Information on at least one of the start address ADD_0 and the end address ADD_n−1 is stored at the index address ADD_INDEX. The index address ADD_INDEX is already known to the sensor module 300 and the IoT device 310 and may be predefined or preset by processor 2 312 of the IoT device 310. Therefore, processor 2 312 may know the start address and the end address at which data is stored by requesting the information stored at the index address from processor 1 302 and may read the data ranging from the start address to the end address by requesting the data from processor 1 302.

The memory 304 of the sensor module based on the address structure of FIG. 4 is operated as follows. The memory 304 of the sensor module is configured to store data at each address. For example, the memory 304 of the sensor module sequentially stores data at each address from the start address ADD_0 to the end address ADD_n−1. Also, the memory 304 of the sensor module stores address information on the start address ADD_0 and the end address ADD_n−1 at a predefined index address ADD_INDEX. The storing of such data may be performed according to an instruction of processor 1 302. The operation of storing data at each address may be executed in the same way from the perspective of processor 1 302. For example, processor 1 302 may sequentially store data to be transmitted in the area ranging from the start address ADD_0 to the end address ADD_n−1 of the memory 304 of the sensor module.

The method of storing data into the memory 304 of the sensor module may facilitate the implementation of the standardized protocol 350 according to the present embodiment. In what follows, an operation procedure of the standardized protocol 350 using the address structure above will be described. The operation of the standardized protocol 350 disclosed below is described based on the assumption that processor 1 302 and processor 2 312 are the main entities; however, the operation of processor 1 302 may describe the operation of the sensor module 300, and the operation of processor 2 312 may describe the operation of the IoT device 310.

Figure 5:
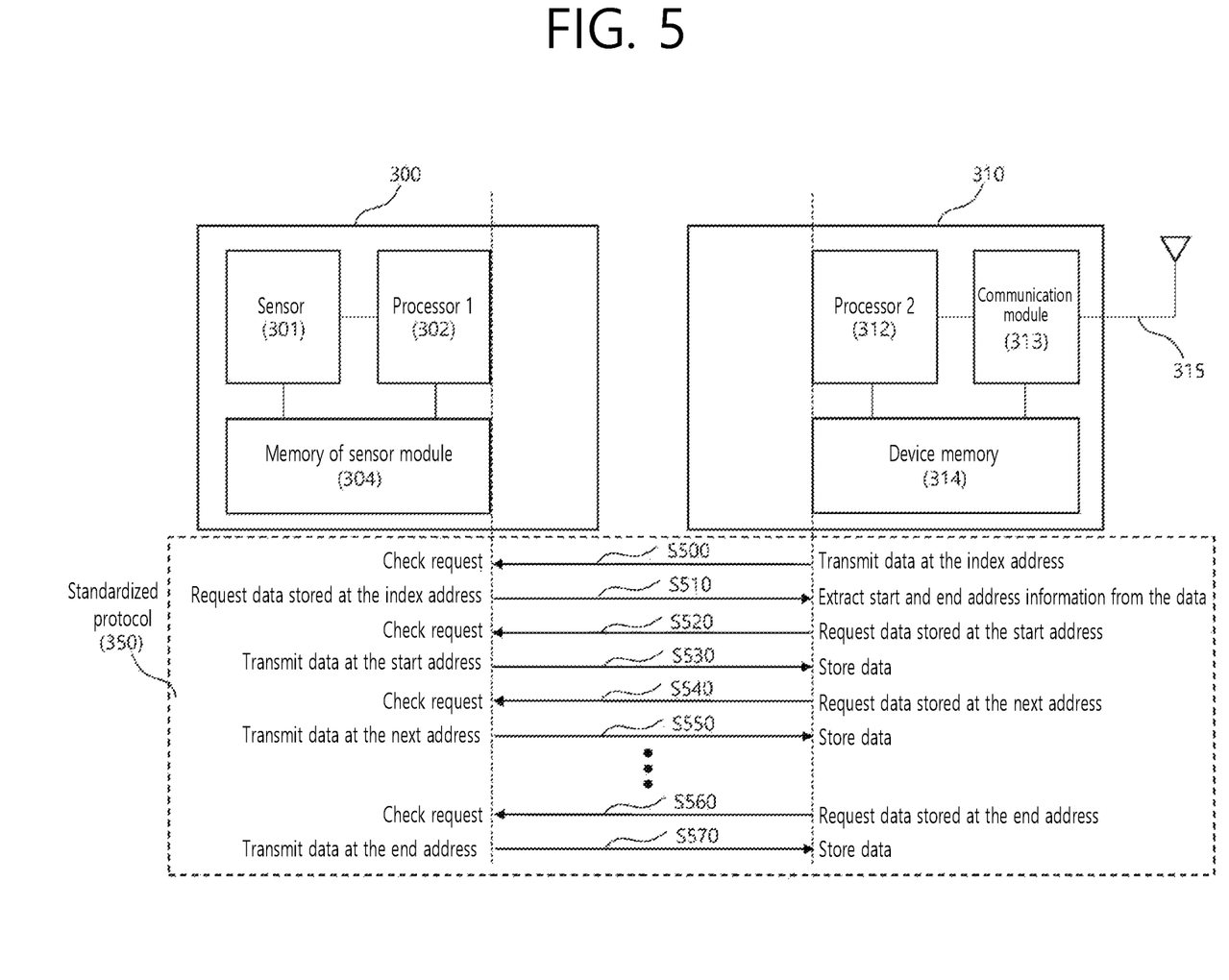
FIG. 5 is a flow diagram illustrating a standardized protocol according to one embodiment.

FIG. 5 is a flow diagram illustrating a standardized protocol according to one embodiment.

Referring to FIG. 5, when communication with processor 1 302 is initiated, processor 2 312 requests the data stored at a predefined index address ADD_INDEX from processor 1 302, and processor 1 302 checks the request S500.

When processor 1 302 transmits the data stored at the index address ADD_INDEX of processor 1 302 to processor 2 312, processor 2 312 reads the data stored at the index address ADD_INDEX S510. At this time, the index address ADD_0 includes information on the start address ADD_0 and the end address of the data. Therefore, processor 2 312 may extract the start address ADD_0 and the end address ADD_0 of the data to be transmitted by processor 1 302 only by reading the data at the index address ADD_INDEX S510.

Processor 2 312 sequentially requests, from processor 1 302, the data stored at each address from the start address ADD_0 to the end address ADD_n−1 and stores received data into the device memory 314, S520, S530, S540, S550, S560, S570.

Then processor 2 312 transmits the received data through the communication module 313 and the antenna 315 according to a predefined communication routine.

A standardized protocol or data communication between the sensor module 300 and the IoT device 310 may be initiated by an instruction of the sensor module 300 or an instruction of the IoT device 310 or may be performed at a predetermined period. In what follows, the operation described above will be disclosed.

Figure 6:
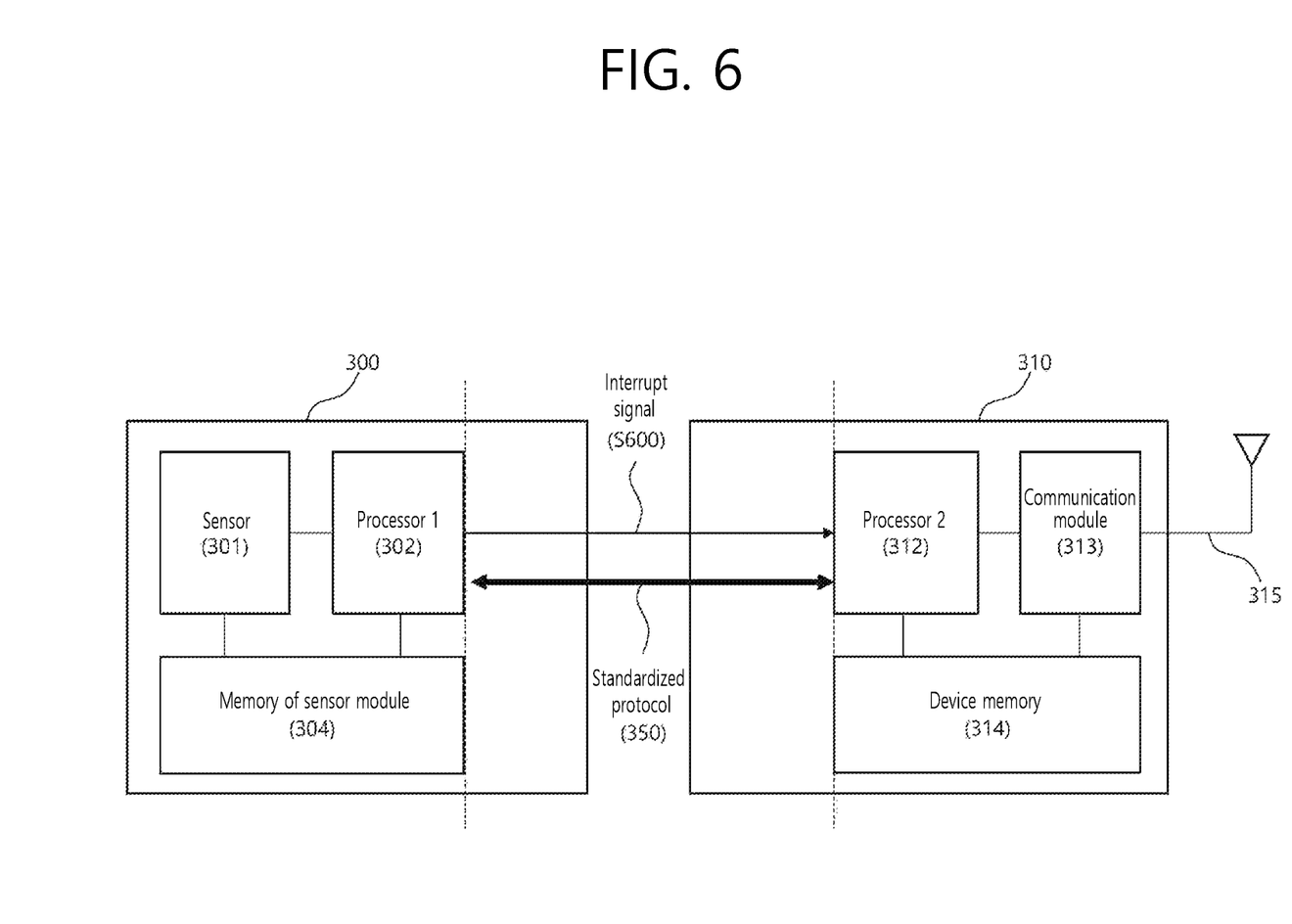
FIG. 6 is a flow diagram illustrating a method for initiating a standardized protocol between a sensor module and an IoT device according to one embodiment.

FIG. 6 is a flow diagram illustrating a method for initiating a standardized protocol between a sensor module and an IoT device according to one embodiment. The flow diagram illustrates the operation that initiates the standardized protocol according to an instruction of the sensor module.

Referring to FIG. 6, processor 1 302 transmits an interrupt signal to processor 2 312 to request data communication with the IoT device 310, S600. The interrupt signal may be transmitted based on general-purpose input/output (GPIO) ports. Processor 2 312 receives the interrupt signal through a GPIO port and initiates the standardized protocol 350. In other words, processor 2 312 sequentially reads data from processor 1 302 and transmits the data through the communication module 313 and the antenna 315.

Figure 7:
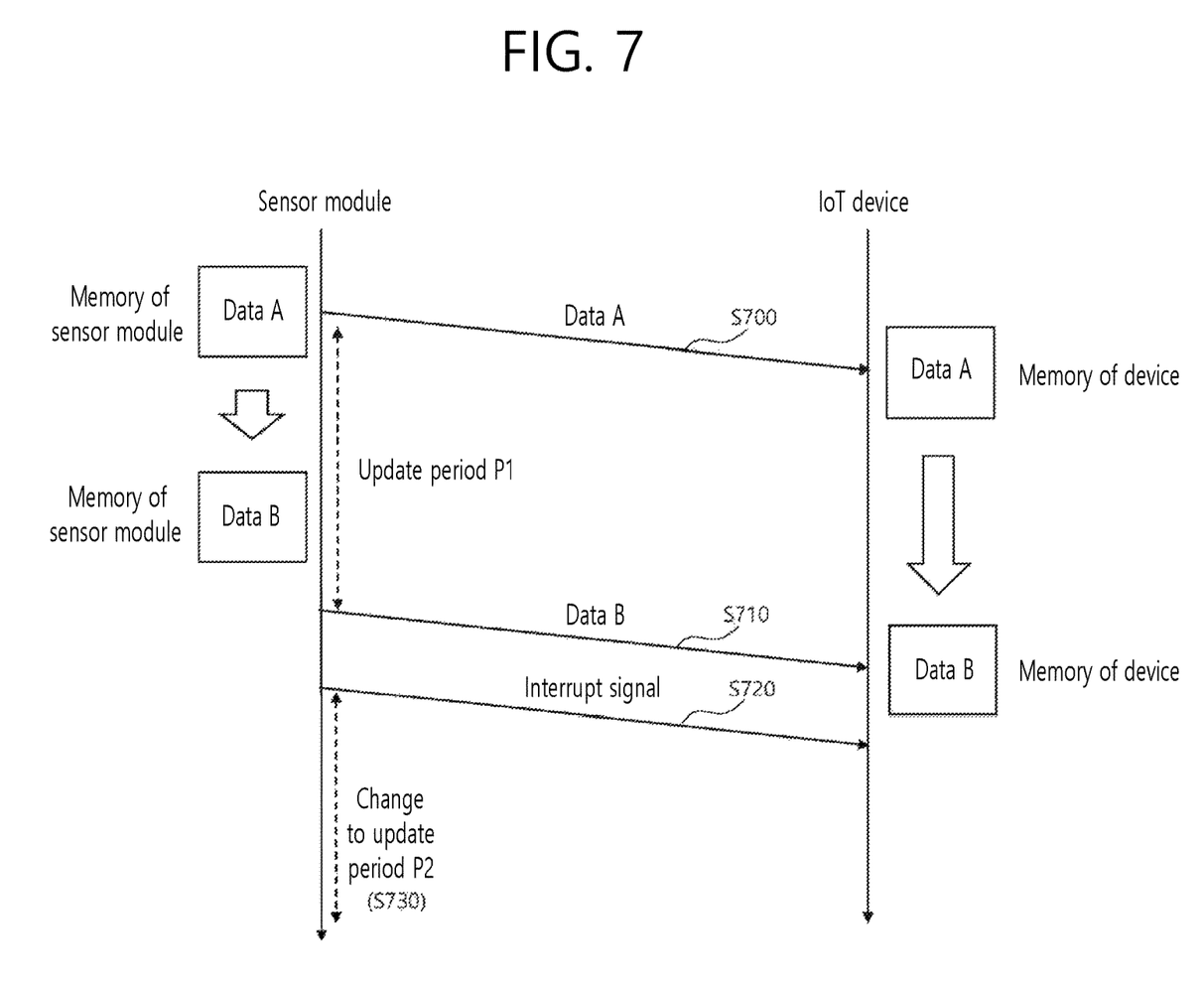
FIG. 7 is a flow diagram illustrating a method for performing a periodic update of data by a sensor module and an IoT device according to one embodiment.

FIG. 7 is a flow diagram illustrating a method for performing a periodic update of data by a sensor module and an IoT device according to one embodiment.

Referring to FIG. 7, the sensor module 300 stores data A into the memory 304 of the sensor module. Then processor 1 302 transmits data A to the IoT device 310 based on a standardized protocol 350, S700.

The IoT device 310 stores the received data A into the device memory 314.

Afterward, the sensor module 300 generates sensing data B and stores the sensing data B into the memory 304 of the sensor module. When an update period P1 elapses since the data A is transmitted, processor 1 302 transmits data B to the IoT device 310 based on the standardized protocol 350 again, and the IoT device 310 stores data B into the device memory 314, S710.

According to the embodiment, the data of the memory 314 of the IoT device 310 may be periodically updated with the data stored in the memory 304 of the sensor module 300.

The main control entity may be designated for an IoT communication system composed of the sensor module 300 and the IoT device 310.

For example, the main control entity of the sensor module 300 is processor 1 302, and the main control entity of the IoT device 310 may be processor 2 312.

As another example, communication may be performed based on a master-slave structure in which the sensor module 300 and the IoT device 310 are used independently of each other in a normal condition while the IoT device 310 operates as a master device, and the sensor module 300 operates as a slave device only when the sensor module 300 and the IoT device 310 initiate data communication.

Meanwhile, the data update period P1 may be a period previously set by default by the IoT device 310. In other words, data is updated at a period predetermined by the IoT device 310. If the sensor module 300, which is a slave device, does not want to use the period P1, processor 1 302 of the sensor module 300 transmits an interrupt signal to processor 2 312 of the IoT device 310, S720. In other words, processor 1 302 may change the update timing or period to P2 by using the interrupt signal S730.

In what follows, synchronization of data and sharing of a memory area will be disclosed.

In one embodiment, when the sensor module 300 stores data (e.g., sensing data) in a predetermined area of the memory 304 of the sensor module, the data stored in the predetermined area is transmitted to the IoT device 310.

In one aspect, the sensor module 300 and the IoT device 310 may share the predetermined area or information on the predetermined area.

In another aspect, a predetermined area of the memory 304 of the sensor module and a predetermined area of the memory 314 of the IoT device may be synchronized. A specific example thereof will be described with reference to FIG. 8.

Figure 8:
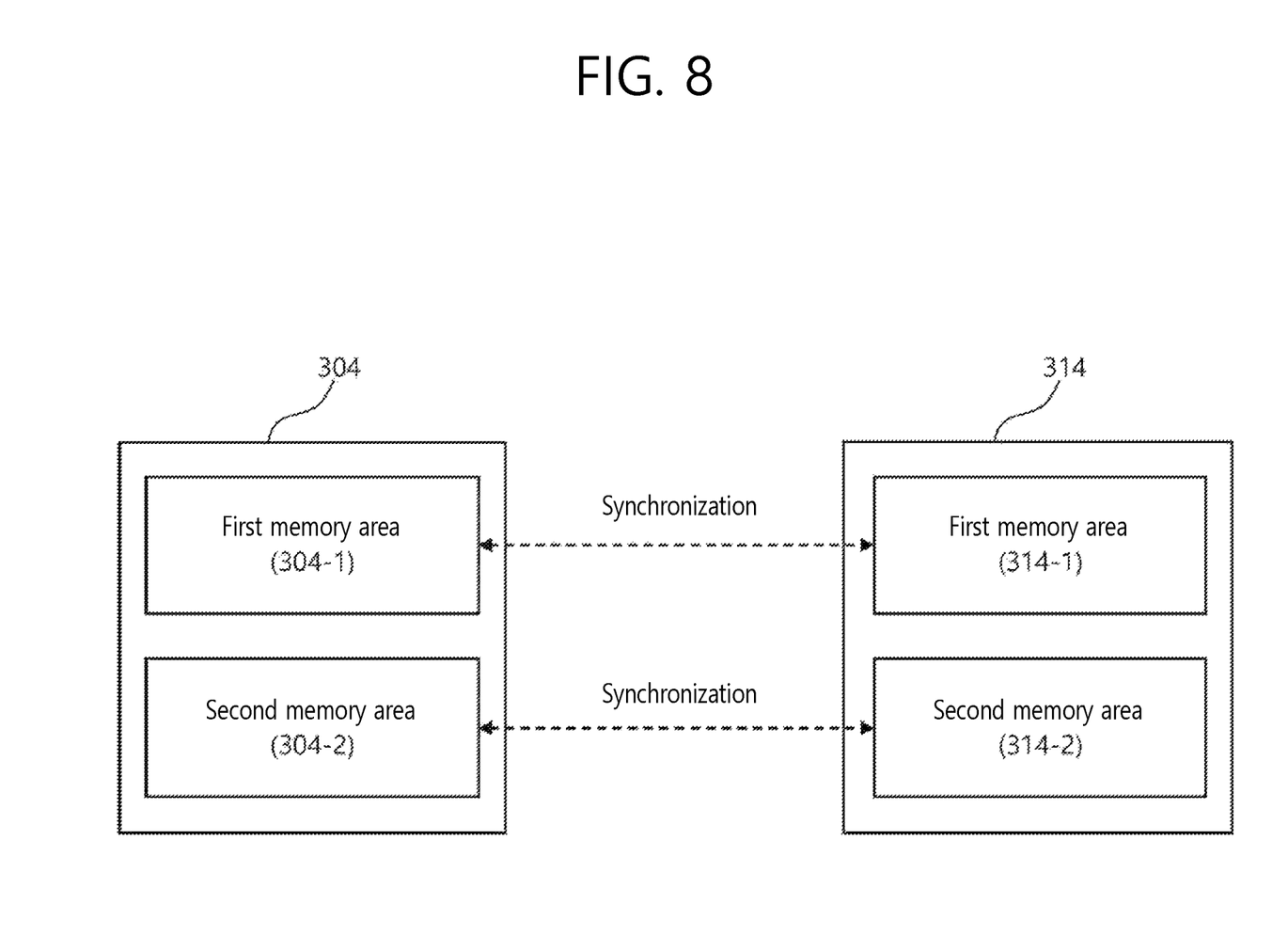
FIG. 8 illustrates a memory structure for synchronizing data according to one embodiment.

FIG. 8 illustrates a memory structure for synchronizing data according to one embodiment.

Referring to FIG. 8, the memory 304 of the sensor module includes a first memory area 304-1 and a second memory area 304-2, and the memory 314 of the IoT device includes a first memory area 314-1 and a second memory area 314-2. The present example assumes that two predetermined areas are defined in each memory; however, the assumption is only an example, and three or more areas may exist in one memory.

A synchronization procedure based on the separated memory area structure is as follows.

As an example, the first memory area 314-1 of the IoT device memory 314 may be synchronized based on the first memory area 304-1 of the memory 304 of the sensor module, and the second memory area 304-2 of the memory 304 of the sensor module may be synchronized based on the second memory area 314-2 of the IoT device memory 314.

For example, when the sensing data of the sensor module 300 is transmitted to the IoT device 310, the synchronization procedure includes a step of updating the data of the first memory area 314-1 of the IoT device with the data recorded in the first memory area 304-1 of the sensor module. Meanwhile, when an interrupt signal of the IoT device 310 is transmitted to the sensor module 300, the synchronization procedure includes a step of updating the data of the second memory area 304-2 of the sensor module as the data recorded in the second memory area 314-2 of the IoT device.

In this case, the addresses of the first memory area 304-1 and the second memory area 304-2 of the sensor module may be determined to have predetermined values. Similarly, the addresses of the first memory area 314-1 and the second memory area 314-2 of the IoT device may also be determined to have predetermined values.

In the case of the IoT device 310, parameters related to data communication with the sensor module 300, standardized protocol, synchronization, and memory setting may be preset to implement the functions according to the present disclosure. In other words, for the operation and processing of the IoT device 310 according to the present disclosure, the sensor module 300 may i) preset a function for communication connection with the IoT device 310 using specific values and may ii) set a function for storing data to be transmitted into a predetermined memory using predetermined or default memory address values. Accordingly, an update may be possible without considering the state of the IoT device 310, and an update procedure of the sensor module 300 for connection with the IoT device 310 may be simplified.

In the exemplary system described above, methods are described according to a flow diagram using a series of steps and blocks. However, the present disclosure is not limited to a specific order of the steps, and some steps may be performed with different steps and in a different order from those described above or simultaneously. Also, it should be understood by those skilled in the art that the steps shown in the flow diagram are not exclusive, other steps may be further included, or one or more steps of the flow diagram may be deleted without influencing the technical scope of the present disclosure.

What is claimed is:

1. An IoT device comprising:
a connect unit connecting with a sensor module;
a processor performing data communication with the sensor module through the connect unit;
a device memory storing data read from the sensor module through the data communication; and
a communication module wirelessly transmitting the data stored in the device memory,
wherein the processor is configured to perform the data communication, based on a standardized communication protocol between the sensor module and the IoT device, by
transmitting to the sensor module a request for address information stored at a predefined index address within a memory of the sensor module,
receiving the address information from the sensor module, and
reading the data stored in an area within the memory of the sensor module ranging from a start address to an end address indicated by the address information.

2. The IOT device of claim 1, wherein the reading of the data includes:
sequentially transmitting to the sensor module a request for a data block stored at each address ranging from the start address to the end address; and
receiving data blocks stored at the respective addresses from the sensor module.

3. The IoT device of claim 1, wherein the processor initiates the standardized communication protocol when an interrupt signal is received from the sensor module.

4. The IoT device of claim 1, wherein the processor performs the data communication based on one of the Universal Asynchronous Receiver/Transmitter (UART), Inter-Integrated Circuit (I2C), and Serial Peripheral Interface (SPI) protocols.

5. The IoT device of claim 1, wherein the processor updates the data by performing the data communication based on a predetermined period.

6. The IoT device of claim 5, wherein the processor changes the period when an interrupt signal is received from the sensor module.

7. The IoT device of claim 1, wherein a first area of the device memory is synchronized based on a first area of the memory of the sensor module, and a second area of the memory of the sensor module is synchronized based on a second area of the device memory.

8. The IoT device of claim 7, wherein
the first area and the second area of the device memory are predetermined to have predetermined values, and
the first area and the second area of the memory of the sensor module are predetermined to have predetermined values.

9. A sensor module comprising:
a sensor generating data through sensing;
a memory sequentially storing the data at each address ranging from a start address to an end address and storing address information on the start address and the end address at a predefined index address;
a connect unit connecting with an IoT device; and
a processor performing data communication with the IoT device through the connect unit and transmitting the data stored in the memory of the sensor module to the IoT device,
wherein the processor is configured to perform the data communication, based on a standardized communication protocol between the sensor module and the IoT device, by
receiving from the IoT device a request for address information stored at the index address,
transmitting the address information to the IoT device,
receiving from the IoT device a request to transmit the data in an area ranging from the start address to the end address indicated by the address information, and
transmitting the data to the IoT device.

10. The sensor module of claim 9, wherein the processor initiates the standardized communication protocol when transmitting an interrupt signal to the IoT device.

11. The sensor module of claim 9, wherein the processor performs the data communication based on one of the Universal Asynchronous Receiver/Transmitter (UART), Inter-Integrated Circuit (I2C), and Serial Peripheral Interface (SPI) protocols.

12. The sensor module of claim 9, wherein the processor transmits the data to the IoT device by performing the data communication based on a predetermined period.

13. The sensor module of claim 12, wherein the processor changes the period when transmitting an interrupt signal to the IoT device.

14. The sensor module of claim 9, wherein a first area of a memory of the IoT device is synchronized based on a first area of the memory of the sensor module, and a second area of the memory of the sensor module is synchronized based on a second area of the memory of the IoT device.

15. The sensor module of claim 14, wherein
the first area and the second area of the memory of the IoT device are predetermined to have predetermined values, and
the first area and the second area of the memory of the sensor module are predetermined to have predetermined values.

16. The sensor module of claim 9, wherein
the data communication is preset to a specific value, and
the start address and the end address in the memory of the sensor module storing the data are preset to a specific value.

* * * * *